Patented Dec. 31, 1929

1,741,574

UNITED STATES PATENT OFFICE

CHARLES E. KRAUS, OF BROOKLYN, NEW YORK, ASSIGNOR TO SIALCO, INCORPORATED, A CORPORATION OF NEW YORK

HEAT INSULATION

No Drawing. Application filed December 28, 1922, Serial No. 609,537. Renewed October 18, 1926.

This invention relates to substances for use in the control of heat transference whether it is desired to prevent waste of heat from heating devices as in furnaces, fireboxes, steam pipes, etc., or to prevent heat from entering refrigerating chambers. The invention may also have uses other than those above referred to and so is not limited thereto, such uses including sound proof structures, light weight partitions, an ingredient of concrete and in fact in all uses where cellulose structures are of use.

It is well-known that bodies of dead air or gas such as are contained in sealed cells are poor conductors of heat and sound and hence that cellular bodides are desirable as heat insulators. Where, however, the cells or passages are not sealed, convection currents, although restricted, tend to transfer the heat and so reduce the insulation efficiency of the brick or other body in which they exist. To prevent this transfer of heat by convection through the insulating body, the cells should be sealed so that their contained air or gas is confined to them and may not move convectionally through the brick or other heat insulating body. It follows from the foregoing that the greater the number of sealed cells, (other things being equal) in a given cubic contents, the better the insulation, also the thinner the walls of the cells the better is the insulation.

It is the main object of the present invention to provide heat insulating material wherein the amount of sealed cellular spaces may be efficiently and reliably accomplished and accurately regulated, and methods of making the same.

Many natural clays burn with vesicular structure upon being over-fired. When, however, the cellular or vesicular structure is formed from the usual natural clays, it is often found that glass is formed. In such cases the walls of the cells become conductors of heat and the insulating value of the material is reduced. Where such fusion is brought about in producing the vesicular structure and glass is produced, there is also another disadvantage in that the walls of a great number of small cells are destroyed and the mass, when finished, contains less cells than where the vesicular structure is produced without such fusion.

According to the present invention suitable materials either as found in the natural state or synthetically produced, are formed into the cellular structures, which I have termed "nodules", by suitable treatment which is best adapted to produce the most efficient structures, and then these cellular structures or nodules are added to the substance or matrix to form the insulating material as a whole, the completed mixture being then subjected to such further treatment as may be necessary, for instance a brick or other shaped body formed from the material may be afterwards fired in the usual way.

By thus treating the cellular structures or "nodules" separately from the remainder of the mixture in which they are used they can be given just such treatment as is required to make them most efficient without regard to the necessities of treatment of the remainder of the mixture, and in this way the cellular structure may be made as efficient as possible. These separately formed cellular structures or "nodules" will therefor be more perfectly formed and reliable, and there is the further advantage that by suitably proportioning the amount of the said cellular structures or "nodules" to the amount of insulating material, the cellular spaces in the insulating material may be accurately proportioned and distributed, preferably uniformly but otherwise if desired, throughout the material. The cellular bodies or "nodules" may also be useful by themselves or in other relations than those referred to.

Other and ancillary objects of the invention will appear hereinafter.

In preparing the "nodules" a gas forming material such as carbon is incorporated in a mineral material such as clay. Such mineral material should be of a plastic nature so that upon being made viscous by heat it will cohere to form sealed cells as the gas is formed within it rather than cracking or being porous. If the proper proportions of carbon or other gas forming material is not found in the mineral material in its natural state it may be added thereto; also if the clay in its natural state is not sufficiently plastic, colloidal matter may be added thereto. The composition is heated to a point at which it becomes viscous, and this heating will cause combustion of the carbon with the oxygen of the air which may be included in the material or which may have access thereto through the pores of the material. When the material has become softened or viscous as before stated it will cohere and form sealed chambers about the carbon particles whereupon the confined generated gases will expand the chambers to form the cells as referred to. In order to facilitate the mixing of this cellular material with other material to form heat insulation or the like it may be broken into pieces after the above treatment or the mixture from which the "nodule" is formed may be dried and broken into pieces before the heat treatment and that treatment may be accomplished in a rotary kiln wherein the rolling of the pieces after they have become softened by the heat causes them to become rounded so that their shape suggest the term "nodules".

As above referred to, the formation of glass in the heat treatment reduces the insulation value and the heat should therefore be carried only to the point sufficient to produce softening of the material and sealing of the cells and below the temperature at which fusion results in the formation of glass. The softening of the clay to produce the desired viscous or sealing condition should be promoted by the addition of fluxes, if they do not occur naturally in the clay, because the longer time and higher temperature otherwise required might result in the consumption of the carbon before the sealing condition was reached so that after sealing there would be no carbon left to form gas to expand the sealed cells. Premature consumption of the carbon may also be guarded against by effecting the heat treatment in a reducing atmosphere such as carbon monoxide. When the heat treatment is accomplished in a reducing atmosphere the "nodule" is apt to have a smoky, smudgy appearance due to unconsumed carbon at the surface. This may be removed by heating up the articles in an oxidizing atmosphere when the surface carbon will be consumed.

While the materials and the treatment to accomplish the invention as above set forth, may be greatly varied, the following is an illustrative example of the compositions and treatment employed. In forming the cellular structure of "nodule" a fine grained clay or shale has added to it a mineral substance having a high colloidal content. To this is added finely divided carbon in the form of a liquid such as oil, sugar in solution, glucose and bitumen or in the form of a powder such as coal-dust etc. The mass is thoroughly mixed with water and made into a paste. The paste is dried and broken into lumps of a suitable size and subjected to a temperature that will cause the mass to become slightly viscous. The temperature at which the nodule is formed is regulated by the softening point of the clay or shale. This softening point may be reduced if necessary or desirable by the addition of fluxes, such as caustic soda, borax, potash, salt, magnesium chloride, etc. The atmosphere in which the cellular structure of "nodule" is made is highly reducing until the maximum of expansion of the nodule is reached. The atmosphere may then be made highly oxidizing so as to burn out the unconsumed carbon. The heat treatment may be made in a rotary kiln which gives the small bodies a round shape, or the mixture may be shaped into bricks or some other large shape and stacked into a stationary kiln so that the gases may pass through. Where a stationary kiln is employed the large lumps are removed from the kiln and broken to the proper size.

As a concrete example of one method of procedure in forming the "nodules", plastic clay 79.5%, carbon 2% (may be contained in a 20% glucose solution), bentonite 18% and salt 5% (in water of a quantity sufficient for solution) are thoroughly mixed in a pug mill (the foregoing proportions refer to weight). The paste is then dried and after being broken into small pieces, is placed in a rotary kiln where, in an atmosphere of carbon monoxide the temperature is raised to 1800 degrees Fahrenheit and then allowed to cool to the atmosphere. The bodies thus treated may then be heated up in an oxidizing atmosphere to burn out the unconsumed carbon as before referred to.

Insulating materials may be made from the "nodules" or cellular structures formed as described by mixing said "nodules" with a suitable body or matrix which may be used as it stands, may be fired or otherwise treated and formed into bricks or other formed bodies as may be desired. Thus the cellular or vesicular structures or "nodules" may be mixed with infusorial earth and a high colloidal clay and also there may be added to the mixture carbonaceous material such as cork, sawdust, sponge, corncob, bark, quebracho wood, stalks, etc., and this mixture may be formed into a brick or other shape body. Also a brick may be made where the colloidal clay, as just referred to, is replaced by ordinary clay.

As an illustrative concrete example the mixture forming the insulating material may be clay 10%, sawdust 16% "nodules" or cellular structures formed as in the concrete example given above 20%, infusorial earth 54% (these proportions refer to weight); or where it is desired to replace the ordinary clay of the formula just recited by a highly colloidal clay, the following formula may be used. Bentonite 5%, sawdust 16%, nodules or cellular structures 20%, infusorial earth 59%. The mixture made according to either of the last two formulas is moistened with water and made into bricks or other suitable shapes, stacked in a kiln and burned or fired in the usual manner.

A cement for laying up the bricks is provided by the same composition as the bricks themselves but not kiln burned.

While the invention has been illustrated in what are considered its best applications it is to be understood that it may be varied both as to compositions and manner of treatment without departing from the spirit of the invention and is not, therefore, limited to the precise details of ingredients and proportions nor manner of treatment as recited.

What I claim is:

1. The method of forming cellular bodies which consists in heating a mixture of clay, bentonite, carbonaceous material and flux sufficiently to form sealed cells.

2. Cellular material comprising a matrix and cellular bodies therein separately formed of a mixture containing bentonite, carbonaceous material and clay.

3. The method of forming cellular material which consists in heating a mixture of clay, bentonite, carbonaceous material and flux sufficiently to form sealed cells and mixing it with a mineral matrix.

4. The method of forming cellular material which consists in mixing a mineral material containing bentonite and adapted to form sealed cells when heated with a substance adapted to form gas when heated and heating the mixture sufficiently to form sealed cells but below the glass forming fusion of said mineral material.

5. The method of forming cellular material which consists in mixing a mineral material containing bentonite and adapted to form sealed cells when heated with a liquid adapted to form gas when heated and heating, the mixture sufficiently to form sealed cells.

6. The method of forming cellular material which consists in mixing a mineral material containing bentonite and adapted to form sealed cells when heated with a liquid solution adapted to form gas when heated and heating, the mixture sufficiently to form sealed cells but below the glass forming fusion of said mineral material.

7. The method of forming cellular material which consists in mixing a mineral material containing bentonite and adapted to form sealed cells when heated with a carbonaceous solution adapted to form gas when heated and heating, in a reducing atmosphere, the mixture sufficiently to form sealed cells, then heating in an oxidizing medium.

8. The method of forming cellular material which consists in mixing a mineral material containing bentonite and adapted to form sealed cells when heated with a carbonaceous liquid adapted to form gas when heated and heating, in a reducing atmosphere, the mixture sufficiently to form sealed cells but below the glass forming fusion of said mineral material then heating in an oxidizing medium.

9. The method of forming cellular material which consists in mixing a mineral material containing bentonite and adapted to form sealed cells when heated with a carbonaceous liquid adapted to form gas when heated and heating the mixture sufficiently to form sealed cells but below the glass forming fusion of said mineral material and then mixing the foregoing with another substance.

10. The method of forming cellular material which consists in mixing a mineral material containing bentonite and adapted to form sealed cells when heated with a carbonaceous liquid adapted to form gas when heated and heating, in a reducing atmosphere, the mixture sufficiently to form sealed cells and then mixing the foregoing with another substance.

11. The method of forming cellular material which consists in mixing a mineral material containing bentonite and adapted to form a fused plastic mass when heated to a given temperature, a substance adapted to form a gas at another temperature and a flux to reduce the temperature at which mineral matter will fuse appreciably below that at which the substance will form a substantial amount of gas.

12. The method of forming cellular material which consists in mixing a mineral material containing bentonite and adapted to form a fused plastic mass when heated to a given temperature, a substance adapted to form a gas at another temperature, a flux to reduce the temperature at which mineral matter will fuse appreciably below that at which the substance will form a substantial amount of gas and heating said mixture to such a temperature as to first fuse said material and then gasify said substance.

13. The method of forming cellular material which consists in mixing a mineral material containing bentonite and adapted to form a fused plastic mass when heated to a given temperature, a substance adapted to form a gas at another temperature, a flux to reduce the temperature at which mineral matter will fuse appreciably below that at which the substance will form a substantial amount of gas and heating said mixture to such a temperature as to first fuse said material and then gasify said substance but not to sufficient temperature to cause said fused mass to assume a glass formation.

14. A method of forming cellular bodies which consists in heating a mixture of clay and bentonite and a flux to form sealed cells when heated at a temperature which causes the softening of the mass.

In testimony whereof I have signed this specification this 27th day of December, 1922.

CHARLES E. KRAUS.